July 19, 1960
C. E. HEMMINGER
2,945,804
HYDROFORMATE FEED IMPROVED BY ADSORPTION OF NORMAL PARAFFINS
Filed March 11, 1957
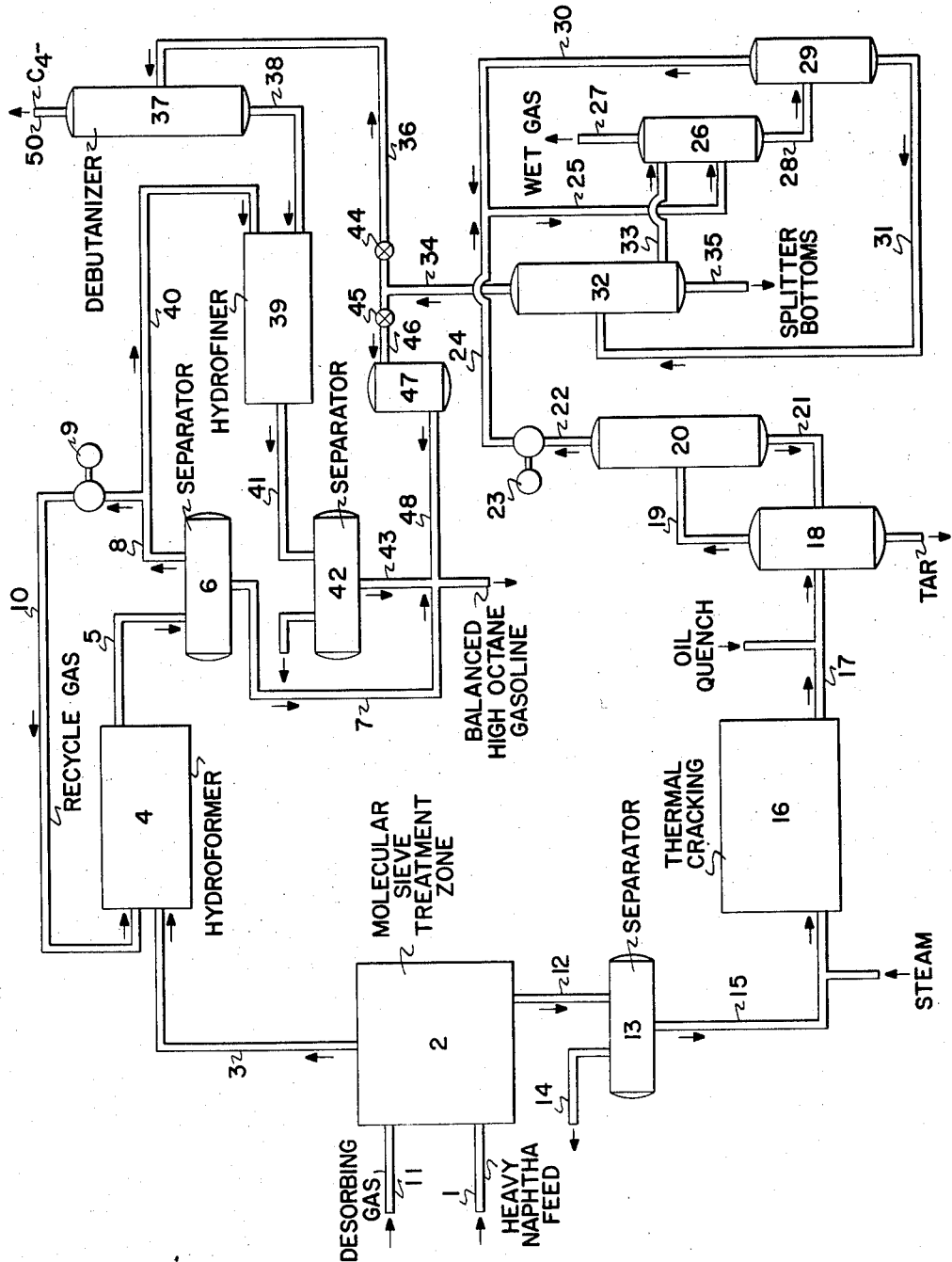
Charles E. Hemminger Inventor
By H. M. Feyrer Attorney United States Patent Office 2,945,804
Patented July 19, 1960

2,945,804
HYDROFORMATE FEED IMPROVED BY ADSORPTION OF NORMAL PARAFFINS

Charles E. Hemminger, Westfield, N.J., assignor to Esso Research and Engineering Company, a corporation of Delaware Filed Mar. 11, 1957, Ser. No. 645,112
7 Claims. (Cl. 208—91)

The present invention relates to the hydroforming of hydrocarbons and particularly to an improved method for upgrading heavy naphtha fractions boiling above about 160°–175° F. to produce high octane number motor fuels in high yields. Fuels prepared by this process contain a more balanced distribution of high octane components throughout the boiling range of the gasoline than is attainable by prior art processes. More particularly the invention of this application relates to using a molecular sieve treatment on the feed to separate out the normal paraffins before passing such feed to hydroforming. The separated paraffins are then thermally cracked at low pressure and the highly olefinic product is reblended with the hydroformate.

Hydroforming is a well known and widely used process for upgrading hydrocarbon fractions boiling in the motor gasoline or naphtha boiling range to increase their octane number and to improve their burning or engine cleanliness characteristics. In hydroforming the hydrocarbon fraction or naphtha is contacted at elevated temperatures and pressures and in the presence of hydrogen or hydrogen enriched process gas with solid catalytic materials under conditions such that there is no consumption of hydrogen and ordinarily there is a net production of hydrogen in the process. A variety of reactions occur during hydroforming, including dehydrogenation of naphthenes to the corresponding aromatics, hydrocracking of paraffins, isomerization of straight chain paraffins to form branch chain paraffins, dehydrocyclization of paraffins and isomerization of compounds such as ethylcyclopentane to form methylcyclohexane which is readily converted to toluene. In addition to these reactions, some hydrogenation of olefins and polyolefins occur and sulfur or sulfur compounds are eliminated by conversion to hydrogen sulfide or to catalytic metal sulfides making the hydroformate burn cleaner or form less engine deposits when used as the fuel in an internal combustion engine.

Hydroforming operations are ordinarily carried out at temperatures of 750°–1050° F. in the pressure range of about 50 to 1000 pounds per square inch and in contact with such catalysts as molybdenum oxide, chromium oxide, or in general, oxides or sulfides of metals of groups IV, V, VI, VII and VIII of the periodic system of elements alone or generally supported on a base or spacing agent such as alumina gel, precipitated alumina or zinc aluminate spinel. A good hydroforming catalyst is one containing about 10 weight percent molybdenum oxide upon an aluminum oxide base prepared by heating a hydrated aluminum oxide or upon a zinc aluminate spinel. A good platinum hydroforming catalyst is one employing an alcoholate (eta) alumina base carrying 0.6 percent by weight of platinum. Catalyst of lower platinum content may be used. Silica alumina base catalyst can also be used but it is somewhat less active.

It has been proposed in patent U.S. 2,689,823, issued September 21, 1954, to effect the hydroforming of naphtha fractions in the presence of a dense fluidized catalyst mass in a fluidized solids reactor system in which naphtha vapors are passed continuously through the dense fluidized bed of hydroforming catalyst particles in a reaction zone, spent catalyst particles being withdrawn from the dense bed in the reaction zone and passed to a spent catalyst regeneration zone where inactivating carbonaceous deposits are removed by combustion, whereupon the regenerated catalyst particles are returned to the main reactor vessel. Fixed bed hydroforming, of course, is conducted by passing the naphtha vapors through a fixed bed of catalyst and if regeneration is required, shutting down the particular reactor, purging to remove reactant vapors, withdrawing the catalyst, or regenerating in situ by passing an oxygen-containing gas through such catalyst bed.

The present invention solves a very real problem. Straight hydroforming produces a gasoline in which the components in the higher boiling half of the total boiling range have a much higher octane rating than do the lower boiling components in the "front end" of the gasoline. This concentration of ON in the "back end" of the gasoline is known in the industry to give poor octane distribution and poor car performance. By the present invention this "front end" octane deficiency is solved by a process that uses the same fraction of the crude as was previously treated by hydroforming and from this produces a balanced gasoline of high octane rating.

It is the object of this invention to provide the art with improved methods of reforming or upgrading petroleum naphthas boiling above about 160°–175° F.

It is the more particular object of this invention to provide a simple and effective method for upgrading petroleum naphthas boiling originally in the range of about 180°–275° F. to form high octane products in high yields.

These and other objects will appear more clearly from the detailed specification and claims which follow.

It has now been found that heavy petroleum naphtha fractions can be converted into very high octane number heavy naphthas with an exceptionally high yield advantage by separating the heavy naphtha feed with molecular sieves having pore openings of about 5 A. into a non-normal paraffin fraction and a normal paraffin fraction, and then subjecting the non-normal paraffin fraction to hydroforming and the normal paraffin fraction to thermal cracking to highly olefinic gasoline components. The two streams are then reblended to form a balanced high octane gasoline.

The advantage of the present invention is due to the poor octane rating of the "front end" of the gasoline produced by hydroforming, and to the poor yield of aromatics obtained in hydroforming normal paraffins, in the order of only 30 to 40 percent when large amounts of catalyst and plant capacity are used. Additionally, sulfur is removed by the molecular sieve pretreatment and if desired 13 A. sieve operations can be combined with the 5 A. sieve operation to completely remove sulfur from the feed.

It has, of course, been known for some time that certain zeolites both naturally occurring and synthetic, and sometimes termed molecular sieves have the property of separating straight chain from branched chain hydrocarbon isomers as well as from cyclic and aromatic compounds. These zeolites have innumerable pores of uniform size and only molecules small enough to enter the pores can be adsorbed. The pores may vary in diameter from 3 or 4 A. to 15 A. or more but it is a property of these zeolites or molecular sieves that any particular product has pores of substantially uniform size.

The scientific and patent literature contains numerous references to the adsorbing action of natural and synthetic zeolites. Among the natural zeolites having this sieving property may be mentioned chabazite. A synthetic zeolite with molecular sieve properties is described in U.S. Patent 2,442,191. Zeolites may vary somewhat in composition but generally contain the elements silicon, aluminum and oxygen as well as an alkali metal and/or an alkaline earth metal e.g. sodium and/or calcium. The naturally occurring zeolite analcite, for instance, has the empirical formula $NaAlSi_2O_6.H_2O$. Barrer U.S. Patent 2,306,610 teaches that all or part of the sodium is replaceable by calcium to yield on dehydration a molecular sieve having the formula $(Ca,Na_2)Al_2Si_4O_{12}.2H_2O$. Black U.S. Patent 2,522,426 describes a synthetic molecular sieve zeolite having a formula $4CaO.Al_2O_3.4SiO_2$. A large number of other naturally occurring zeolites having molecular sieve activity, i.e. the ability to adsorb a straight chain hydrocarbon and exclude or reject the branch chain isomers and aromatics because of differences in molecular size are described in an article entitled "Molecular Sieve Action of Solids" appearing in quarterly reviews, vol. III, pages 293 to 320 (1949) published by the Chemical Society (London).

A 5 A. molecular sieve may be prepared by rapidly mixing an aqueous solution of sodium meta silicate and an aqueous solution of sodium aluminate at a temperature of about 180° F. in proportions such that the mixture has a ratio of $SiO_2:Al_2O_3$ of about 1.5 to 1. A precipitate forms instantaneously of the desired crystalline sodium aluminum silicate which is then withdrawn and treated with an aqueous solution of calcium chloride to replace at least a portion of the sodium content of said material with calcium. The material is then calcined to obtain the desired 5 A. synthetic molecular sieve zeolite.

The present invention will be more clearly understood by reference to the accompanying drawings which diagrammatically illustrate a flow plan in accordance with the teachings of this application.

Referring to the drawing, 1 is the naphtha feed inlet line through which a heavy naphtha boiling say above about 160°–175° F. is supplied to the system. The naphtha feed preheated to a sufficiently high temperature to vaporize it, for example, to temperatures of 150 to 400° F. is charged to molecular sieve treatment zone 2. The adsorbent, any natural or synthetic zeolite of the molecular sieve type heretofore described and having pore diameters of about 5 A. units is arranged in any desired manner in the adsorption zone or tower 2. It may for example be arranged on trays or packed therein with or without supports. A fluid bed of powdered adsorbent may also be used. Conditions maintained in the molecular sieve treatment in adsorption zone or tower are flow rates of 0.1 to 5 v./v./hr., temperatures of about 200°–350° F. and pressures from atmospheric pressure to several p.s.i.g. With molecular sieves of the indicated size of pores the normal paraffins contained in the feed are readily adsorbed while the isoparaffins, naphthenes and aromatics are not adsorbed but passed overhead from the molecular sieve treatment zone and are passed through transfer line 3 into hydroformer 4.

Hydroformer reactor 4 may be of the fluid or fixed bed type, charged with a catalyst containing 0.01 to 1.0 weight percent platinum or 10 to 20 weight percent molybdenum oxide distributed upon a highly pure alumina support such as is obtained from aluminum alcoholate in accordance with U.S. Patent 2,636,865. Temperature of the catalyst bed may be in the range of from 850–1000° F. and the reactor may be operated under a pressure of 25 to 1000 p.s.i.g.

The hydroformate and process gases are removed from the reaction zone, passed through line 5 to suitable catalyst recovery equipment if desired or necessary and then passed through suitable heat exchanger and condenser equipment and thence to a gas-liquid separator 6. The high octane number hydroformate is withdrawn from separator 6 via line 7 and is passed to product storage or blending or is used directly as a high octane number motor fuel. The normally gaseous products are removed from separator 6 through line 8 and are either recycled through compressor 9 and line 10 to the hydroforming reaction zone or are utilized in part in another conversion zone as described below. When the molecular sieves in the adsorption or treatment zone 2 become saturated with normal paraffins as may be readily determined by conventional means such as refractive index, gravity or spectrographic analysis of the effluent, the flow of naphtha feed to the adsorption zone is stopped and the desorption cycle or regeneration of sieves begins. Desorption is effected by passing an olefin-containing gas, preferably one containing a substantial proportion of propylene through line 11 to the treatment zone. For example, cracked refinery gas containing a major proportion of propylene and minor proportions of ethane or propane is a very satisfactory stripping gas. The stripping gas preheated to temperatures of from about 200°–500° F. is passed through the exhausted bed of molecular sieves, the olefins in the stripping gas serving to displace the normal paraffins from the sieves. The desorbed normal paraffins and excess stripping gas are discharged from the molecular sieve treatment zone 2 through line 12 and are cooled and condensed and passed into gas-liquid separator 13. The gaseous material is rejected via line 14 and the normal paraffins from the original naphtha feed are withdrawn via line 15 and passed to thermal cracking zone 16. The sieves are then heated to remove the olefins so that they may again be used in the process. Any slowly accumulating carbon deposition on the adsorbent is burnt off with diluted air controlled by oxygen concentration to avoid temperatures higher than 1100° F.

Thermal cracking is conducted at 10–1000 p.s.i.g., preferably at low pressures in the range of 50–100 p.s.i.g. Also, preferably, steam is used at essentially 10 p.s.i.g. and about 75 weight percent steam to produce a 30–40 weight percent conversion to dry gas. Following thermal cracking the product is passed through line 17 where it is quenched with a gas oil boiling in the range of about 500°–800° F. before being passed to tar removal column 18. From such column the overhead is passed through line 19 to another column 20 wherein a bottoms fraction is separated for recycle through line 21 to the tar removal column. The overhead vapors from column 20 are passed through line 22 to compressor 23 and through lines 24 and 25 to absorber 26. Absorber 26 utilizes an absorber oil boiling above about 300°–350° F. Wet gas passes overhead through line 27 to a suitable refinery light ends recovery system not shown and is subjected to conventional catalytic polymerization of the propylene and butylenes to a high octane gasoline which is blended into the final product. The absorbed material and absorber oil pass through line 28 to stripper 29 where light gases are stripped out and recycled through lines 30 and 25 to the absorber. From column 29 liquid is passed through line 31 to splitter 32 where the absorber oil is separated for return to the absorber through line 33, product is taken overhead through line 34 and splitter bottoms containing the heavier components of the quench oil are sent through line 35 from the system or for recycle to the oil quench step.

The product stream is passed from line 34 through valve 44 and line 36 past closed valve 45 to debutanizer 37 where the $C_4-$ material is removed overhead through line 50 to suitable processing not shown. From the bottom of column 37 the $C_5+$ material is passed through line 38 to hydrofiner 39 operating at about 400 p.s.i.g. and 600–800° F., with a cobalt molybdate on alumina catalyst and hydrogen treat gas supplied at the rate up to about 1,000 s.c.f./b. feed. The temperature and space velocity in the order of 1 to 10 v./v./hr. are adjusted according to the severity of thermal cracking used so that all the diolefins in the feed to the hydrofiner are converted and only a small part of the monolefins are saturated. This treat gas is hydroformer tail gas supplied through line 40 from the non-normal paraffin fraction hydroforming previously described. From the hydrofiner, product passes through line 41 to separator 42 where hydrofiner off-gas is separated overhead. The $C_5+$ highly olefinic, high octane, low boiling liquid product is then passed through line 43 and is mixed with hydroformate from line 7 to produce a balanced high octane gasoline. Alternatively, if desired, after the absorber stripper treatment the product stream may be passed from line 34 through open valve 45 past closed valve 44 to line 46 and simple clay treater 47. Clay treating is a conventional substitute operation in place of hydrofining. Product from the clay treater is then passed through line 48 to join the product from line 7 as above described. The invention is also not limited to the low pressure thermal cracking in the presence of steam as discussed. Conventional 10–1000 p.s.i. thermal reforming may also be used.

Several variations on the above operation not shown in the diagram are:

(1) A desulfurization treatment on the feed to the molecular sieve step can be employed to a level of about 0.04%. The sieve will then remove additional sulfur so that essentially non-regenerative platinum hydroforming may be employed if desired on the non-normal paraffin feed.

(2) A 13 A. molecular sieve treatment can be employed before the 5 A. molecular sieve treatment shown in the diagram to remove substantially larger amounts of sulfur from the feed and to produce a total blended gasoline of very low sulfur content.

The following example is illustrative of the present invention:

*Example*

A heavy naphtha boiling in the range (5% to 95%) of 170° F. to 335° F. having an API gravity of 61°, a Research clear octane number of 39 obtained from Arabian crude oil is separated into a normal paraffin fraction and a normal paraffin free fraction by treatment with a molecular sieve adsorbent which is selective for the removal of normal paraffins from branched chain paraffins and cyclic hydrocarbons. This treatment is conducted by passing the vaporized naphtha through a column of sieve particles at atmospheric pressure at a temperature of about 250° F. The flow of naphtha vapor through the sieve particles is continued until the capacity of the sieves for adsorbing normal paraffins is reached. The unadsorbed portion comprising the normal paraffin-free fraction is obtained in a yield of 76 volume percent and has a Research clear octane number of about 60. The adsorbed normal paraffins are recovered from the sieve by passing propylene gas over the sieve at about 350° F. The propylene displaces the normal paraffins from the sieve. The normal paraffin fraction which is obtained in a yield of 24 percent comprises about 10 percent of normal hexane and about 30 volume percent of normal heptane, the remainder being higher boiling paraffinic hydrocarbons.

The normal paraffin fraction is steam cracked at 10 p.s.i.g. and 1400° F. with 75 weight percent of steam, 35 percent conversion to dry gas being obtained. The stream from thermal cracking is quenched with a gas oil boiling (5 percent to 95 percent) in the range of 500–800° F. Tar removal columns 18 and 20 are operated at 4 p.s.i.g. and the absorber stripper debutanizer system is operated at 200 p.s.i.g. Hydrofiner 39 is operated at about 675° F., 400 p.s.i.g., 700 s.c.f./b. of feed hydrogen treat gas rate, and utilizes a 10 percent cobalt molybdate on alumina catalyst. The steam cracked product from the paraffins has a Research clear octane number of 88 and is obtained in a yield of 40 percent based on normal paraffin feed to the steam cracker.

The normal paraffin free fraction is hydroformed by contacting with a catalyst comprising 0.6 weight percent platinum deposited on alumina at a pressure of 300 p.s.i.g., at a temperature of 940° F., in the presence of 4,000 cubic feet of added hydrogen per barrel and at a feed rate of 3 weights of feed per hour per weight of catalyst. The hydroformed product having a Research clear octane number of 97 is obtained in a yield of 80 volume percent based on the non-normal paraffin feed.

By this invention 14 volumes of the olefin fraction from steam cracking and from the polymerization plant are available for blending with 61 volumes of the hydroformate based on original feed. The blend which is obtained has a Research clear octane number of 96. The "front end" critical components of the blend boiling in the range (5 percent to 95 percent) of 100° F. to 200° F. has a clear Research octane number of 92.

The foregoing description contains a limited number of embodiments of the present invention. It will be understood, however, that this invention is not limited thereto since numerous variations are possible without departing from the spirit of this invention.

What is claimed is:

1. A method for upgrading a heavy virgin naphtha fraction boiling above about 160°–175° F. to a high octane gasoline product having a balanced high octane number rating for its lower boiling as well as for its higher boiling components, which comprises vaporizing the heavy virgin naphtha fraction, passing the resulting vapors of said fraction through a bed of molecular sieves having a pore diameter of about 5 angstrom units which selectively adsorb normal paraffins from said vapors, recovering a remaining vapor stream of the naphtha fraction essentially free of normal paraffins, hydroforming the thus recovered naphtha hydrocarbons freed of the normal paraffins in said remaining vapor stream by contact with a hydroforming catalyst in the presence of hydrogen at from 750°–1050° F. and at pressures of from 50–1000 p.s.i.g. for a period sufficient to raise the octane number of the hydroforming product to above about 95 Research octane number, desorbing the adsorbed normal paraffins from the molecular sieves, thermally steam cracking the normal paraffins desorbed from the sieves to produce lower boiling $C_5+$ naphtha hydrocarbons which are highly olefinic, gaseous olefins and tars, fractionating and treating the thermal cracking product to remove tars, gaseous components and to recover said lower boiling $C_5+$ olefinic naphtha hydrocarbons substantially free of diolefins, and blending the recovered lower boiling $C_5+$ highly olefinic naphtha products of the thermal cracking boiling in the range of 100° to 200° F. with the naphtha product from the hydroforming to obtain the high octane gasoline product.

2. The process of claim 1 in which the thermal cracking is conducted at low pressure in the presence of steam.

3. The process of claim 1 in which the thermal steam cracking is conducted at about 10 p.s.i.g. and 1400° F. with about 75 weight percent steam to produce about 35 percent conversion to dry gas.

4. The process of claim 1 in which the hydroforming catalyst is platinum on alumina.

5. The process of claim 1 in which the hydroforming catalyst is molybdenum oxide on alumina.

6. The process of claim 1 in which light olefin polymers formed from gaseous olefins in said process are blended into the fuel.

7. The process of claim 1 in which the normal paraffins that are thermally steam cracked to lighter olefins are normal hexane and higher boiling normal paraffins adsorbed from a virgin naphtha boiling from about 170°–335° F. by the molecular sieves.

References Cited in the file of this patent

UNITED STATES PATENTS

| | | |
|---|---|---|
| 2,510,673 | Annable | June 6, 1950 |
| 2,534,025 | Howes et al. | Dec. 12, 1950 |
| 2,782,145 | Ferris | Feb. 19, 1957 |
| 2,786,802 | Hanisian et al. | Mar. 26, 1957 |
| 2,818,455 | Ballard et al. | Dec. 31, 1957 |
| 2,849,504 | Kang et al. | Aug. 26, 1958 |
| 2,886,508 | Hess et al. | May 12, 1959 |